United States Patent Office 2,905,697
Patented Sept. 22, 1959

2,905,697

CONDENSATION OF CONJUGATED CYCLOALKADIENES WITH p-DIOXENES AND RESULTANT PRODUCTS

Louis Schmerling, Riverside, Ill., assignor, by mesne assignments, to Universal Oil Products Company, Des Plaines, Ill., a corporation of Delaware No Drawing. Application March 5, 1956
Serial No. 569,280

14 Claims. (Cl. 260—340.3)

This invention relates to new compositions of matter which are prepared by condensing a cycloalkadiene and an unsaturated heterocyclic compound, and more particularly to the condensation products resulting from the reaction between a conjugated cycloalkadiene and a six-membered unsaturated heterocyclic compound containing four carbon atoms and two non-adjacent oxygen atoms in the ring.

It is an object of this invention to prepare polycyclic compounds in which one of the rings contains two oxygen atoms.

A further object of this invention is to prepare polycyclic condensation products which are capable of destroying insects.

One embodiment of this invention is found in a process which comprises condensing a compound selected from the group consisting of conjugated cycloalkadienes and halo-substituted conjugated cycloalkadienes with a six-membered unsaturated heterocyclic compound containing four carbon atoms and two non-adjacent oxygen atoms in the ring, and recovering the resultant condensation product.

A specific embodiment of the invention is found in a process which comprises condensing a polyhalocyclopentadiene with a six-membered unsaturated heterocyclic compound containing four carbon atoms and two non-adjacent oxygen atoms in the ring at an elevated temperature in the range of from about 50° to about 200° C., and recovering the resultant product.

A more specific embodiment of the invention resides in a process which comprises condensing a molar proportion of hexachlorocyclopentadiene with a molar proportion of p-dioxadiene (or, as it is also named, p-dioxin) at an elevated temperature in the range of from about 50° to about 250° C., and recovering the resultant 5,6,7,8,9,9-hexachloro-4a,5,8,8a-tetrahydro-5,8-methanobenzo-p-dioxadiene.

Another embodiment of the invention is found in a new composition of matter comprising the condensation product of the reaction between the compound selected from the group consisting of conjugated cycloalkadienes and halo-substituted conjugated cycloalkadienes and a six-membered unsaturated heterocyclic compound containing four carbon atoms and two non-adjacent oxygen atoms in the ring.

Other objects and embodiments of the invention referring to alternative conjugated cycloalkadienes, halo-substituted conjugated cycloalkadienes and six-membered unsaturated heterocyclic compounds containing four carbon atoms and two non-adjacent oxygen atoms in the ring will be referred to in the following further detailed description of the invention.

It is now proposed to condense a conjugated cycloalkadiene or a halo-substituted conjugated cycloalkadiene with a six-member unsaturated heterocyclic compound containing four carbon atoms and two non-adjacent oxygen atoms at an elevated temperature. The products of this condensation may be used for a variety of products. For example, the condensation of hexachlorocyclopentadiene with p-dioxadiene will result in a tricyclic or pentacyclic compound containing six or twelve chlorine atoms, respectively, depending upon the molar proportion of the hexachlorocyclopentadiene to dioxadiene. Condensation of hexachlorocyclopentadiene with p-dioxene will result in a tricyclic compound containing six chlorine atoms. These condensations are illustrated by the following equations:

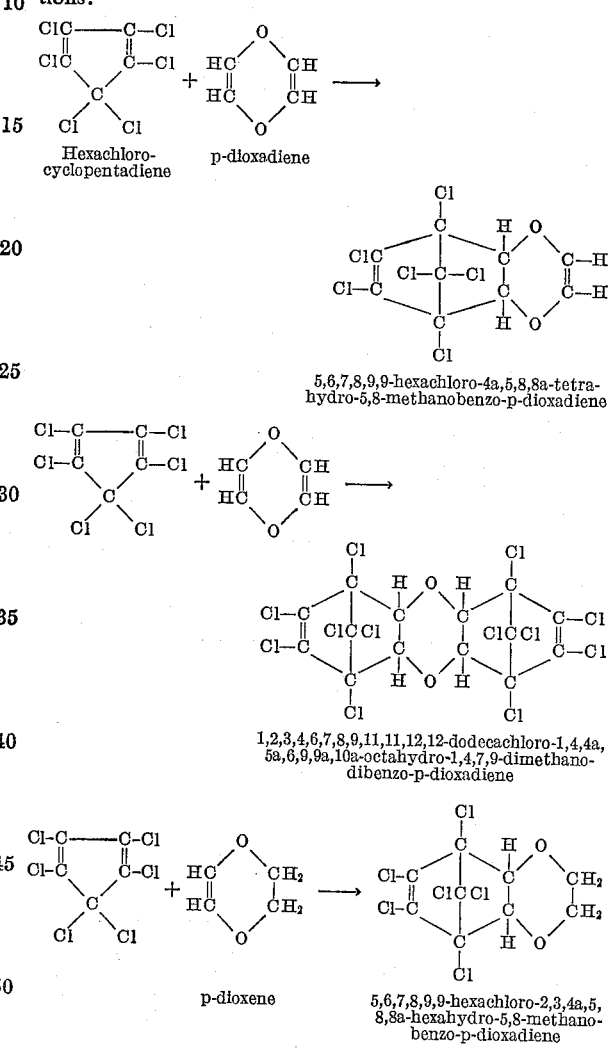

Desirable products may also be obtained by first condensing the p-dioxene or p-dioxadiene with cyclopentadiene and then reacting the product so obtained with hexachlorocyclopentadiene. These polychloro substituted polycyclic compounds are useful as insecticides, particularly against houseflies, Mexican bean beetles, pea aphids and mites.

It is also contemplated within the scope of this invention that a conjugated cycloalkadiene containing more than one species of halo substituents may be condensed with a six-membered unsaturated heterocyclic compound containing at least two oxygen atoms in the ring.

Examples of conjugated cycloalkadienes or halosubstituted conjugated cycloalkadienes which may be condensed with six membered unsaturated heterocyclic compounds containing at least two oxygen atoms in the ring according to this invention include 1,3-cyclopentadiene (hereinafter referred to as cyclopentadiene), 5-chlorocyclopentadiene, 5,5-dichlorocyclopentadiene, 2,3-dichlorocyclopentadiene, 2,3,4-trichlorocyclopentadiene, hexachlorocyclopentadiene, 5-bromocyclopentadiene, 5,5-dibromocyclopentadiene, 2,3-dibromocyclopentadiene, 2,3,4 - tribromocyclopentadiene, hexabromocyclopentadiene, 5 - fluorocyclopentadiene, 5,5 - difluorocyclopentadiene, 2,3 - difluorocyclopentadiene, 2,3,4 - trifluorocyclopentadiene, hexafluorocyclopentadiene, 1,3 - cyclohexadiene, 1 - chloro - 1,3 - cyclohexadiene, 1,2 - dichloro - 1,3-cyclohexadiene, 5,6-dichloro-1,3-cyclohexadiene, 1,2,3-trichloro - 1,3 - cyclohexadiene, 1,2,3,4 - tetrachloro - 1,3-cyclohexadiene, 5,5,6,6 - tetrachloro - 1,3 - cyclohexadiene, octachloro - 1,3 - cyclohexadiene, 1 - bromo - 1,3-cyclohexadiene, 1,2 - dibromo - 1,3 - cyclohexadiene, 1,2,3 - tribromo - 1,3 - cyclohexadiene, 1,2,3,4 - tetrabromo - 1,3 - cyclohexadiene, octabromo - 1,3 - cyclohexadiene, 1 - fluoro - 1,3 - cyclohexadiene, 1,2 - difluoro - 1,3 - cyclohexadiene, 1,2,3 - trifluoro - 1,3 - cyclohexadiene, 1,2,3,4-tetrafluoro-1,3-cyclohexadiene, octafluoro-1,3-cyclohexadiene, etc.

Examples of six-membered unsaturated heterocyclic compounds containing four carbon atoms and two non-adjacent oxygen atoms in the ring which may be condensed with the aforementioned cycloalkadienes or halosubstituted cycloalkadienes include p-dioxadiene (i.e. 1,4-dioxin or p-dioxin), p-dioxene (i.e. 2,3-dihydro-p-dioxin), m-dioxene (i.e. 1,3-dioxene or m-dioxin) etc.; alkyl substituted six-membered unsaturated heterocyclic compounds containing four carbon atoms and two non-adjacent oxygen atoms in the ring including 2-methyl-p - dioxadiene, 2,3 - dimethyl - p - dioxadiene, 2,3,5,6-tetramethyl - p - dioxadiene, 2 - ethyl - p - dioxadiene, 3 - ethyl - p - dioxadiene, 2,3 - diethyl - p - dioxadiene, 2,3,4,5 - tetraethyl - p - dioxadiene, 2 - propyl - p - dioxadiene, 2,3 - dipropyl - p - dioxadiene, 2 - methyl - p-dioxene, 2,3 - dimethyl - p - dioxene, 2 - ethyl - p - dioxene, 2,3 - diethyl - p - dioxene, etc., 2 - methyl - m-dioxin, 2 - ethyl - m - dioxin, 2,5,6 - trimethyl - m-dioxin, etc. Halo-substituted six-membered unsaturated heterocyclic compounds containing four carbon atoms and two non-adjacent oxygen atoms in the ring include 2 - chloro - p - dioxadiene, 2,3 - dichloro - p - dioxadiene, 2,3,5,6 - tetrachloro - p - dioxadiene, 2 - bromo - p - dioxadiene, 2,3 - dibromo - p - dioxadiene, 2,3,5,6 - tetrabromo - p - dioxadiene, 2 - fluoro - p - dioxadiene, 2,3-difluoro - p - dioxadiene, 2,3,5,6 - tetrafluoro - p - dioxadiene, 2 - chloro - p - dioxene, 5 - chloro - p - dioxene, 2,3 - dichloro - p - dioxene, 5,6 - dichloro - p - dioxene, 2 - bromo - p - dioxene, 2,3 - dibromo - p - dioxene, 5 - bromo - p - dioxene, 5,6 - dibromo - p - dioxene, 2-fluoro-p-dioxene, 2,3-difluoro-p-dioxene, 5-fluoro-p-dioxene, 2-chloro-m-dioxin, 2-bromo-m-dioxin, 2-fluoro-m-dioxin, 2,5-dichloro-m-dioxin, 2,5,6-trichloro-m-dioxin, etc. It is to be understood that the above mentioned conjugated cycloalkadienes, halo-substituted conjugated cycloalkadienes, six-membered unsaturated heterocyclic compounds containing four carbon atoms and two non-adjacent oxygen atoms and their halogen and alkyl substitution products are only representative of the classes of compounds which may be used, and that said invention is not necessarily limited thereto.

The condensation reaction provided herein, generally characterized as one of the Diels-Alder type, is effected at an elevated temperature in the range of from about 50° to about 250° C. or more, and preferably at a temperature in the range of from about 100° to about 200° C. Temperatures which are greatly in excess of the upper limits are generally undesirable due to a possibility that such high temperatures may cause the desired product to deteriorate. Lower temperatures are usually not used because the reaction usually takes place too slowly at such temperatures. Suitable reaction pressures range from atmospheric to about 20 atmospheres and even higher; superatmospheric pressure is advantageous in providing an essentially liquid phase reaction mixture, said pressure often being provided by charging nitrogen, carbon dioxide or other inert gases into the reactor. The residence time of the reactants in the reaction mixture may vary depending upon the particular temperature and pressure employed, said residence time being in the range of from about 1 to about 10 hours or more. When employing temperatures in the lower portion of the hereinbefore indicated range the time required to complete the reaction will be relatively long, while the use of temperatures in the higher portion of the range substantially reduces the residence time required to complete the reaction. The use of a temperature in the lower range and a short reaction time will tend to allow some unreacted starting materials to remain in the reaction mixture, however, these materials will not impede the recovery of the desired product.

The reactants will be present in the reaction mixture in a molar ratio of cycloalkadiene or polyhalocycloalkadiene to six-membered unsaturated heterocyclic compounds containing four carbon atoms and two non-adjacent oxygen atoms in the ring, in a range of from 0.4:1 to 5:1. The use of excess of the diene reactant provides an effective diluent of the reaction mixture thereby enabling the rate of the resultant exothermic reaction to be controlled within the desired limits. The product of the reaction is recovered from the reaction mixture by fractional distillation or, in some cases, by crystallization. The unreacted starting materials being the lowest boiling components of the reaction mixture may be removed therefrom merely by distilling the same from the mixture, leaving a residue comprising the desired condensation products. The latter residue may be thereafter purified, for example, by fractional distillation, crystallization, extraction or by other means well-known in the art, or utilized directly without further treatment for the preparation of other compositions. If the reaction product is to be used as an insecticide the product may be additionally treated if so desired, to introduce additional halogen substituents into the structure. In addition the condensation product may also be treated in other ways, for example, by reaction with metal to effect total or partial dehalogenation or with alkaline material to effect total or partial dehydrohalogenation.

It is also contemplated within the scope of this invention that the condensation process described herein may be effected in the presence of an inert solvent or diluent which will not be reactive at the temperatures used. The preferred diluents which may be used include aliphatic and aromatic hydrocarbons, alcohols, ethers, etc., such as hexane, heptane, benzene, toluene, xylene, ethyl alcohol, ethyl ether, etc.

The physical properties of the present polycyclic condensation products and the effects they have on entomological forms of life make them particularly desirable as insecticides and insect repellants, the compounds having many of the features desired of materials for this purpose. They are, for example, toxic to insects which are destructive of plant life and materials normally subject to insect infestation, their toxic effects being manifested by contact of the poison with the insect. The insecticides comprising the present compound are thus effective against chewing as well as sucking types of insects. Volatility, which is an important characteristic of insecticides is usually dependent upon the molecular weight of the compound. The compounds of the present invention are sufficiently volatile so that when applied to plant life intended for subsequent human consumption, the plants when harvested and after allowing a reasonable time for evaporation of the applied insecticide therefrom retain none of the toxicant to prevent use of the plant for consumption as food. On the other hand, the compounds are of sufficiently limited volatility due to their relatively high molecular weights to be retained on the substance for the time required to accomplish the toxic effects of the compounds. In addition, the volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water by the addition of an emulsifying agent, such as a surface active agent, to the mixture of components. The latter solvents and dispersants may also be employed for the specific purpose of reducing the concentration of insecticide to the desired level in a specific insecticide formulation. The particular formulation of active components in combination with the solvent or dispersant will depend upon its application. Compositions containing as high as 20% of active component may be preferred, in some instances where deep penetration of the insecticide is desired, as in the treatment of fibrous material, such as wood, for extinction of a particular infestation, for example, wood termites. For other purposes the required concentration of active components in the formulation may be as low as 0.1%, as for example, in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc., and the resulting solution atomized by a suitable spraying device.

The process of the present invention wherein a conjugated cycloalkadiene or halo substituted conjugated cycloalkadiene and a six-membered unsaturated heterocyclic compound containing four carbon atoms and two non-adjacent oxygen atoms in the ring are condensed, may be effected in any suitable manner and may comprise either a batch or a continuous type operation. For example, when a batch type operation is used, a quantity of the reactants, namely, the cycloalkadiene or halo-substituted cycloalkadiene and the six-membered heterocyclic compound containing four carbon atoms and two non-adjacent oxygen atoms in the ring, with or without a diluent, are placed in an appropriate condensation apparatus containing mixing and heating means. The reaction vessel is heated to the desired temperature and maintained at such temperature for a predetermined period of time, usually not over 10 hours. At the end of this time, the reaction vessel and contents thereof are cooled to room temperature and the condensation product is separated by conventional means such as fractional distillation, crystallization, extraction or other means well-known in the art.

The condensation products of this invention may also be prepared by a continuous process wherein the reactants are continuously charged to a reaction vessel maintained at suitable operating conditions of temperature and pressure. The condensation product stream is continuously withdrawn from the reactor and separated from unreacted starting materials and/or unwanted side reaction products which may have formed, and purified by conventional means hereinbefore set forth, while the unreacted compounds are recycled for further use as a portion of the feed material.

Examples of condensation products prepared according to this invention include 4a,5,8,8a-tetrahydro-5,8-methanobenzo-p-dioxadiene, 2,3,4a,5,8,8a-hexahydro-5,8-methanobenzo-p-dioxadiene, 5,6,7,8,9,9-hexachloro - 4a,5,8,8a-tetrahydro-5,8-methanobenzo - p - dioxadiene, 5,6,7,8,9,9-hexachloro - 2,3,4a,5,8,8a - hexahydro-5,8-methanobenzo - p - dioxadiene, 6,7-dichloro - 2,3,4a,5,8,8a-hexahydro - 5,8 - methanobenzo - p - dioxadiene, 6,7-dichloro-4a,5,8,8a - tetrahydro - 5,8 - methanobenzo-p-dioxadiene, 2 - methyl - 5,6,7,8,9,9 - hexachloro - 2,3,4a,5,8,8a-hexahydro - 5,8 - methanobenzo - p - dioxadiene, 2-methyl-5,6,7,8,9,9 - hexachloro - 4a,5,8,8a-tetrahydro - 5,8,-methanobenzo - p - dioxadiene, 2,3-dimethyl-5,6,7,8,9,9-hexachloro - 2,3,4a,5,8,8a - hexahydro - 5,8-methanobenzo-p-dioxadiene, 2,3 - dimethyl - 5,6,7,8,9,9 - hexachloro-4a,5,8,8a - tetrahydro - 5,8-methanobenzo - p - dioxadiene, 2-ethyl - 5,6,7,8,9,9 - hexachloro - 2,3,4a,5,8,8a - hexahydro - 5,8 - methanobenzo-p-dioxadiene, 2-ethyl-5,6,7,8,9,9 - hexachloro - 4a,5,8,8a - tetrahydro - 5,8 - methanobenzo - p - dioxadiene, 2,3 - diethyl - 5,6,7,8,9,9,-hexachloro - 2,3,4a,5,8,8a - hexahydro - 5,8 - methanobenzo-p - dioxadiene, 2,3 - diethyl - 5,6,7,8,9,9 - hexachloro - 4a,5,8,8a - tetrahydro - 5,8 - methanobenzo - p - dioxadiene, 2,5,6,7,8,9,9 - heptachloro - 2,3,4a,5,8,8a - hexahydro - 5,8 - methano - 1,4 - benzo - p - dioxadiene, 2,5,6,7,8,9,9,-heptachloro - 4a,5,8,8a - tetrahydro - 5,8 - methanobenzo-p-dioxadiene, 2,3,5,6,7,8,9,9 - octachloro - 2,3,4a,5,8,8a-hexahydro - 5,8 - methanobenzo - p - dioxadiene, 2,3,5,6,7,8,9,9 - octachloro - 4a,5,8,8a - tetrahydromethanobenzo - p - dioxadiene, 1,2,3,4,6,7,8,9,11,11,12,12-dodecachloro - 1,4,4a,5a,6,9,9a,10a - octahydro - 1,4,6,9-dimethanodibenzo-p-dioxadiene, 1,4,4a,5a,6,9,9a,10a-octahydro-1,4,6,9-dimethanodibenzo-p-dioxadiene, etc.

The present invention is further illustrated with respect to specific embodiments thereof in the following examples which, however, are not intended to limit the generally broad scope of the present invention in strict accordance therewith.

*Example I*

Equimolar proportions of hexachlorocyclopentadiene and p-dioxene (i.e., 2,3-dihydro-p-dioxin) are placed in a reaction vessel. The vessel is slowly heated to a temperature of approximately 145° and maintained thereat for a period of approximately four hours, the contents of said vessel being continuously stirred during this period. At the end of this time the vessel and contents thereof are allowed to cool to room temperature and the reaction products therein are subjected to fractional distillation under reduced pressure. The fraction comprising 5,6,7,8,9,9 - hexachloro - 2,3,4a,5,8,8a - hexahydro - 4,8-methanobenzo-p-dioxadiene is separated therefrom.

*Example II*

Equimolar proportions of cyclopentadiene and p-dioxene are placed in a reaction vessel which is heated to a temperature of approximately 180°. The contents of the vessel are subjected to continuous mixing while said vessel is maintained at the abovementioned temperature for a period of about five hours. At the end of this time the vessel and contents thereof are allowed to cool to room temperature. The reaction product is then subjected to fractional distillation under reduced pressure and the cut, comprising 2,3,4a,5,8,8a-hexahydro-5,8-methanobenzo-p-dioxadiene, is separated therefrom.

*Example III*

Two molecular proportions of hexachlorocyclopentadiene and one molecular proportion of p-dioxadiene are placed in a reaction vessel similar to that described in the above examples. The vessel is heated to a temperature of about 120–130° and maintained thereat for a period of about ten hours, the contents of said vessel being continuously stirred during this residence time. At the end of this period the vessel and contents thereof are cooled to room temperature and the reaction product subjected to fractional distillation under reduced pressure. The cut, comprising 1,2,3,4,6,7,8,9,11,11,12,12-dodecachloro-1,4,4a,5a,6,9,9a,10a - octahydrodimethanodibenzo-p-dioxadiene, is recovered therefrom.

*Example IV*

Equimolar portions of hexachlorocyclopentadiene and p-dioxadiene are placed in a reaction vessel similar to that described in the above examples. The vessel is heated to a temperature of about 120–130° and maintained thereat for a period of about ten hours, the contents of said vessel being continuously stirred during this residence time. At the end of this period the vessel and contents thereof are cooled to room temperature and the reaction product subjected to fractional distillation under reduced pressure. The cut, comprising 5,6,7,8,9,9-hexachloro - 4a,5,8,8a - tetrahydro - 5,8 - methanobenzo - p-dioxadiene, is recovered therefrom.

*Example V*

The polychloro substituted condensation products hereinbefore set forth such as 5,6,7,8,9,9-hexachloro-2,3,4a,5,8,8a - hexahydro - 4,8 - methanobenzo-p-dioxadiene and 1,2,3,4,6,7,8,9,11,11,12,12-dodecachloro-1,4,4a,5,6,9,9a,10a-octahydrodimethanodibenzo-p-dioxadiene are tested for insecticidal activity by dissolving 1.5 g. of the respective solutions in 2 cc. of benzene and emulsifying the resulting solutions with 150 cc. of water using Triton X–100 as an emulsifying agent. These solutions are then sprayed in cages containing a number of houseflies, each of said solutions exhibiting insecticidal activity by killing a substantial number of the flies.

I claim as my invention:

1. A process which comprises condensing a compound selected from the group consisting of cyclopentadiene, 1,3-cyclohexadiene and halo-substituted cyclopentadiene and 1,3-cyclohexadiene with a six-membered unsaturated heterocyclic compound selected from the group consisting of p-dioxadiene, p-dioxene and alkyl-substituted and halo-substituted p-dioxadienes and p-dioxenes and recovering the resultant condensation product.

2. A process which comprises condensing a compound selected from the group consisting of cyclopentadiene, 1,3-cyclohexadiene and halo-substituted cyclopentadiene and 1,3-cyclohexadiene with a six-membered unsaturated heterocyclic compound selected from the group consisting of p-dioxadiene, p-dioxene and alkyl-substituted and halo-substituted p-dioxadienes and p-dioxenes at a temperature in the range of from about 50° to about 250° C., and recovering the resultant condensation product.

3. A process which comprises condensing a compound selected from the group consisting of cyclopentadiene, 1,3-cyclohexadiene and halo-substituted cyclopentadiene and 1,3-cyclohexadiene with a six-membered unsaturated heterocyclic compound selected from the group consisting of p-dioxadiene, p-dioxene and alkyl-substituted and halo-substituted p-dioxadienes and p-dioxenes at a temperature in the range of from about 100° to about 200° C., and recovering the resultant condensation product.

4. A process which comprises condensing cyclopentadiene with a six-membered unsaturated heterocyclic compound selected from the group consisting of p-dioxadiene, p-dioxene and alkyl-substituted and halo-substituted p-dioxadienes and p-dioxenes at an elevated temperature in the range of from about 100° to about 200° C., and recovering the resultant condensation product.

5. A process which comprises condensing a polyhalocyclopentadiene with a six-membered unsaturated heterocyclic compound selected from the group consisting of p-dioxadiene, p-dioxene and alkyl-substituted and halo-substituted p-dioxadienes and p-dioxenes at an elevated temperature in the range of from about 100° to about 200° C., and recovering the resultant condensation product.

6. A process which comprises condensing hexachlorocyclopentadiene with a six-membered unsaturated heterocyclic compound selected from the group consisting of p-dioxadiene, p-dioxene and alkyl-substituted and halo-substituted p-dioxadienes and p-dioxenes at an elevated temperature in the range of from about 100° to about 200° C., and recovering the resultant condensation product.

7. A process which comprises condensing hexachlorocyclopentadiene with p-dioxene at an elevated temperature in the range of from about 50° to about 250° C., and recovering the resultant 5,6,7,8,9,9-hexachloro-2,3,4a,5,8,8a-hexahydro-5,8-methanobenzo-p-dioxadiene.

8. A process which comprises condensing a molar proportion of hexachlorocyclopentadiene with a molar proportion of p-dioxadiene at an elevated temperature in the range of from about 50° to about 250° C., and recovering the resultant 5,6,7,8,9,9-hexachloro-4a,5,8,8a-tetrahydro-5,8-methanobenzo-p-dioxadiene.

9. A process which comprises condensing two molecular proportions of hexachlorocyclopentadiene with one molecular proportion of p-dioxin at an elevated temperature in the range of from about 50° to about 250° C., and recovering the resultant 1,2,3,4,6,7,8,9,11,11,12,12-dodecachloro - 1,4,4a,5a,6,9,9a,10a - octahydro - 1,4,6,9-dimethanodibenzo-p-dioxadiene.

10. A process which comprises condensing a molar proportion of cyclopentadiene with a molar proportion of p-dioxene at an elevated temperature in the range of from about 50° to about 250° C., and recovering the resultant 2,3,4a,5,8,8a-hexahydro-5,8-methanobenzo - p - dioxadiene.

11. 5,6,7,8,9,9-hexachloro-2,3,4a,5,8,8a-hexahydro-5,8-methanobenzo-p-dioxadiene.

12. 5,6,7,8,9,9 - hexachloro - 4a,5,8,8a - tetrahydro-5,8-methanobenzo-p-dioxadiene.

13. 1,2,3,4,6,7,8,9,11,11,12,12 - dodecachloro-1,4,4a,5a,6,9,9a,10a - octahydro-1,4,6,9-dimethanodibenzo-p-dioxa - diene.

14. 2,3,4a,5,8,8a-hexahydro-5,8-methanobenzo-p-dioxadiene.

References Cited in the file of this patent

UNITED STATES PATENTS

| | | |
|---|---|---|
| 2,606,910 | Herzfeld | Aug. 12, 1952 |
| 2,733,248 | Lidov | Jan. 31, 1956 |
| 2,779,769 | Robitschek | Jan. 29, 1957 |